United States Patent
Van Druten et al.

(10) Patent No.: US 8,801,560 B2
(45) Date of Patent: Aug. 12, 2014

(54) TRANSMISSION SYSTEM FOR A VEHICLE

(71) Applicant: DTI Group B. V., Eindhoven (NL)

(72) Inventors: Roell Marie Van Druten, Eindhoven (NL); Alexander Franciscus Anita Serrarens, Waalre (NL); Bas Gerard Vroemen, Eindhoven (NL)

(73) Assignee: DTI Group, B.V., Eindhoven (NL)

( * ) Notice: Subject to any disclaimer, the term of this patent is extended or adjusted under 35 U.S.C. 154(b) by 0 days.

(21) Appl. No.: 13/657,039

(22) Filed: Oct. 22, 2012

(65) Prior Publication Data

US 2013/0184119 A1 Jul. 18, 2013

Related U.S. Application Data

(63) Continuation of application No. PCT/NL2011/050272, filed on Apr. 20, 2011.

(30) Foreign Application Priority Data

Apr. 20, 2010 (NL) ...................................... 2004581
Jan. 25, 2011 (NL) ...................................... 2006067

(51) Int. Cl.
*F16H 37/02* (2006.01)
(52) U.S. Cl.
USPC .......................................... 475/207; 475/218

(58) Field of Classification Search
USPC .................................................. 475/207, 218
See application file for complete search history.

(56) References Cited

U.S. PATENT DOCUMENTS

| 4,200,006 | A | 4/1980 | Ehrlinger |
| 2003/0148847 | A1 | 8/2003 | Kawamoto et al. |
| 2007/0060432 | A1* | 3/2007 | Van Druten et al. ............... 475/5 |

FOREIGN PATENT DOCUMENTS

| EP | 0 314 644 | 5/1989 |
| EP | 1260733 | 11/2002 |
| EP | 1 626 204 | 2/2006 |
| WO | WO2004103755 | 12/2004 |
| WO | WO 2008/151443 | 12/2008 |

* cited by examiner

*Primary Examiner* — Derek D Knight
(74) *Attorney, Agent, or Firm* — Eric Karich

(57) ABSTRACT

A transmission system has an input connected to a drive source, and an output connected to a load. The transmission system further has a transmission that includes two input shafts and an output shaft, as well as a clutch module comprising a clutch and a planetary gear set which comprises three rotational members of which a first rotational member is connected to the input, a second rotational member is coupled to the output and a third rotational member is connected to a brake. Between the input shafts and the output shaft are located three speed transforming gears and three gear clutches, and between the two input shafts is located a further clutch.

18 Claims, 1 Drawing Sheet

TRANSMISSION SYSTEM FOR A VEHICLE

CROSS-REFERENCE TO RELATED APPLICATIONS

This application for a utility patent is a continuation of a previously filed application, now abandoned, having the application number PCT/NL2011/050272, filed 20 Apr. 2011. This application also claims the benefit of Netherlands application NL2006068, filed 25 Jan. 2011 and Netherlands application NL2004581, filed 20 Apr. 2010.

FIELD OF THE INVENTION

The invention relates to a transmission system for a vehicle, having an input which can be connected to a drive source, and an output which can be connected to a load, and comprising:
- a transmission comprising a transmission housing having a first input shaft, and an output shaft connected to the output, where a first switchable speed transforming gear is present between the first input shaft and the output shaft,
- a clutch having a first clutch section which is connected to the input, and a second clutch section which is connected to the first input shaft of the transmission, and
- a planetary gear set comprising at least three rotational members of which a first rotational member is connected to the input, a second rotational member is coupled to the output, and a third rotational member is connected to a brake.

STATE OF THE ART

A transmission system of this type is known from EP-A-1 625 037. When applied to a vehicle, the speed transforming gear of the transmission may be changed with the transmission system known from this publication without the torque transfer from the drive source to the wheels being interrupted by actuation of the brake. The module forming part of this known transmission system is pre-eminently suitable for application to existing transmissions. With a slight modification of the clutch the module may be installed between the clutch and the transmission and then be placed in parallel with the transmission or in parallel with the transmission and the clutch.

SUMMARY OF THE INVENTION

It is an object of the invention to provide a transmission system of the type defined in the opening paragraph which is more cost-effective than the known transmission system and with which even without an interruption of the torque transfer from the drive source to the wheels a switch may be made between two or more speed transforming gears. For this purpose, the transmission system according to the invention is characterized in that the transmission further includes a second input shaft where a second switchable speed transforming gear is present between the second input shaft and the output shaft, and where the second rotational member of the planetary gear set is connected to the second input shaft. The transmission system according to the invention can be used in a vehicle in lieu of a transmission and a clutch and in a simpler and more cost-effective way than the known transmission system because the transmission needs to include fewer speed transforming gears to still be able to realize different transmission ratios in equal measure.

The planetary gear set may be present in a space that is located between the transmission housing and a partition affixed to the outside of the transmission housing.

Preferably, however, the planetary gear set is not present in a space that is located between the transmission housing and a partition affixed to the outside of the transmission housing. The planetary gear set is preferably located inside the transmission housing where the planetary gear set may be located in a sub-space separated from the transmission by a partition if any. The planetary gear set may also be located outside the transmission housing in a separate wet or dry space.

The further embodiments of the transmission system according to the invention and mentioned hereinafter all add to optimization of the transmission system in as simple and cost-effective manner as possible, where compactness and weight of the system plays an important role.

The transmission ratios of the planetary gear set and the transmission are preferably selected such that the lowest forward gear of the transmission system can be attained by closing the brake.

An advantageous embodiment of the transmission system is characterized in that the first and the second rotational member can be coupled directly to each other by means of the clutch and a further clutch connected in series thereto, without the use of a further speed transforming gear.

Preferably, the further clutch is then located in the transmission between the first and the second input shaft.

The further clutch can then directly couple the first and the second input shaft to each other without the use of a further speed transforming gear.

In yet a further embodiment a first gear clutch is located between the first input shaft and the output shaft of the transmission. This first gear clutch is preferably located between the first speed transforming gear and the output shaft.

In again a further embodiment a second gear clutch is located between the second input shaft and the output shaft of the transmission. This second gear clutch is preferably located between the second input shaft and the second speed transforming gear.

In still a further embodiment a third speed transforming gear and a third gear clutch are located between the first input shaft and the output shaft of the transmission. This third gear clutch is preferably located between the third speed transforming gear and the output shaft.

A further advantageous embodiment of the transmission system is characterized in that the second speed transforming gear forms the third gear if the third rotational member of the planetary gear set is braked and the second gear clutch is closed.

Ye a further advantageous embodiment of the transmission system is characterized in that the first speed transforming gear forms the first gear if the third rotational member of the planetary gear set is braked and the further clutch and the first gear clutch are closed.

In another embodiment the first speed transforming gear forms the second gear if the clutch and the first gear clutch are closed.

In a further embodiment the third speed transforming gear forms the fourth gear if the third rotational member of the planetary gear set is braked and the further clutch and the third gear clutch are closed.

In another embodiment the third speed transforming gear forms the fourth gear if the clutch and the third gear clutch are closed.

In yet another embodiment the third speed transforming gear forms the fifth gear if the clutch and the third gear clutch are closed.

A still further advantageous embodiment of the transmission system is characterized in that a reverse gear is present between one of the input shafts and the output shaft of the transmission, which reverse gear does not reverse the direction of rotation between this input shaft and the output shaft of the transmission.

BRIEF DESCRIPTION OF THE DRAWINGS

The invention will be described below in more detail based on an example of embodiment of the transmission system according to the invention represented in the drawing figures, in which.

DETAILED DESCRIPTION OF THE DRAWINGS

Figure 1:
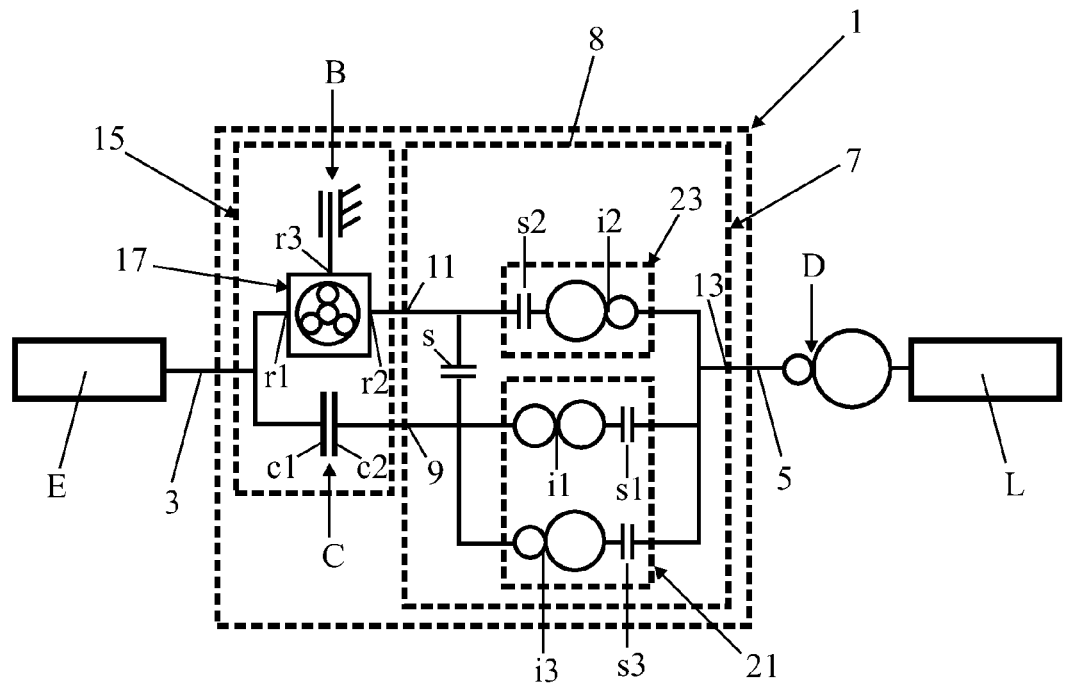
FIG. 1 gives a diagrammatic representation of an embodiment of the transmission system according to the invention.
Figure 2:
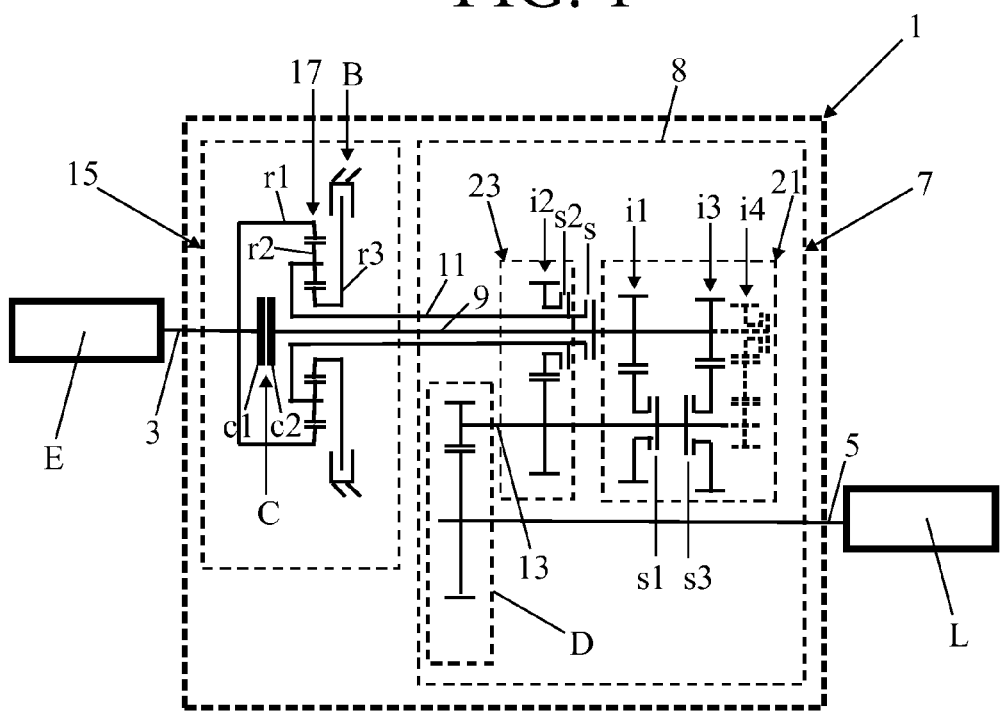
FIG. 2 gives a concrete lay out of the transmission system represented in FIG. 1.

FIGS. 1 and 2 represent an embodiment of the transmission system according to the invention in a diagrammatic and concrete manner respectively. The transmission system 1 comprises an input 3 which is connected to a drive source E, and an output 5 which is connected to a load L by means of a differential gear D. The load is formed by the wheels of a vehicle. The transmission system further includes a transmission 7 having a transmission housing 8 with a first and a second input shaft 9 and 11 and an output shaft 13 which is connected to the output 5. Although the end drive with the differential gear D is shown outside the drawing Figure in the diagrammatic representation of FIG. 1, the end drive is located in the transmission housing 8, as is concretely shown in FIG. 2

The transmission system 1 further includes a clutch module 15 comprising a clutch C and a planetary gear set 17. The clutch comprises a first clutch section c1 which is connected to the input 3, and a second clutch section c2 which is connected to the first input shaft 9 of the transmission. The planetary gear set 17 comprises three rotational members of which a first rotational member r1, which is formed by a ring gear, is connected to the input 3, a second rotational member r2, which is formed by a planet carrier, is coupled to the output 5 via the transmission 7, and a third rotational member r3, which is formed by a sun gear and is connected to a brake B. The transmission ratio between the first and the second rotational member r1 and r2 is found between a value 1 and 2, retarding toward the output, when the third rotational member r3 is braked. And the transmission ratios of the planetary gear set 17 and the transmission 7 are selected such that the lowest forward gear of the transmission system 1 can be attained by closing the brake B.

The planetary gear set 17 is not located in a wet space affixed to the transmission housing 8, but in this embodiment is a grease lubricated gear set. The clutch C is a wet or dry plate friction clutch which is normally closed by means of spring force, and the brake B is a wet or dry plate friction brake which is normally open.

A sub transmission 21 and 23 is present between each input shaft 9 and 11 and the output shaft 13 of the transmission 7. The first sub transmission 21 comprises a first speed transforming gear i1 and a first gear clutch s1 which is present between the first speed transforming gear i1 and the output shaft 13, as well as a third speed transforming gear i3 and a third gear clutch s3 which is present between the third speed transforming gear i3 and the output shaft 13. The second sub transmission 23 comprises a second speed transforming gear i2 and a second gear clutch s2 which is present between the second speed transforming gear i2 and the second input shaft 11.

Between the two input shafts 9 and 11 there is located a further clutch s which can directly couple these two shafts to each other. The further clutch s and the gear clutches s1, s2 and s3 are arranged as synchronised claw clutches.

The speed transforming gears may be selected such that the first speed transforming gear i1 forms the first gear if the third rotational member r3 of the planetary gear set 17 is braked and the further clutch s and the first speed transforming gear s1 are closed, and that the second speed transforming gear i2 forms the third gear if the third rotational member r3 of the planetary gear set 17 is braked and the second gear clutch s2 is closed. Furthermore, the first speed transforming gear i1 forms the second gear if the clutch C and the first gear clutch s1 are closed.

The third speed transforming gear i3 can form the fourth gear if the third rotational member r3 of the planetary gear set 17 is braked and the further clutch s and the third speed transforming gear s3 are closed, or if the clutch C and the third gear clutch s3 are closed. And the third speed transforming gear i3 can form the fifth gear if the clutch C and the third gear clutch s3 are closed.

Furthermore, a reverse gear i4 (represented in FIG. 2 only) may be present between one of the input shafts, in this example the first input shaft 9, and the output shaft 13, which reverse gear i4 does not reverse the direction of rotation between this input shaft and the output shaft of the transmission.

Albeit the invention has been described in the foregoing based on the drawings, it should be observed that the invention is not by any manner or means restricted to the embodiment shown in the drawings. The invention also extends to all embodiments deviating from the embodiment shown in the drawings within the spirit and scope defined by the claims.

What is claimed is:

1. A transmission system for a vehicle having a drive source and a load, the transmission system comprising:
    an input which can be connected to the drive source;
    an output which can be connected to the load;
    a transmission comprising a transmission housing, a first input shaft, and an output shaft connected to the output, where a first switchable speed transforming gear is present between the first input shaft and the output shaft;
    a clutch having a first clutch section which is connected to the input, and a second clutch section which is connected to the first input shaft of the transmission; and
    a planetary gear set comprising at least three rotational members of which a first rotational member is connected to the input, a second rotational member is coupled to the output, and a third rotational member is connected to a brake, wherein the transmission further includes a second input shaft where a second switchable speed transforming gear is present between the second input shaft and the output shaft, and where the second rotational member of the planetary gear set is connected to the second input shaft.

2. A transmission system as claimed in claim 1, wherein transmission ratios of the planetary gear set and the transmission are selected such that the lowest forward gear of the transmission system can be attained by closing the brake.

3. A transmission system as claimed in claim 1, wherein the first and the second rotational members can be coupled directly to each other by means of the clutch and a further clutch or clutches connected in series thereto, without the use of a further speed transforming gear.

4. A transmission system as claimed in claim 3, wherein the further clutch or clutches is/are located in the transmission between the first and the second input shaft.

5. A transmission system as claimed in claim 1, further comprising a reverse gear present between one of the input shafts and the output shaft of the transmission, which reverse gear does not reverse the direction of rotation between this input shaft and the output shaft of the transmission.

6. A transmission system for a vehicle having a drive source and a load, the transmission system comprising:
an input which can be connected to the drive source;
an output which can be connected to the load;
a transmission comprising a transmission housing, a first input shaft (9), and an output shaft connected to the output, where a first switchable speed transforming gear is present between the first input shaft and the output shaft;
a clutch having a first clutch section which is connected to the input, and a second clutch section which is connected to the first input shaft of the transmission; and
a planetary gear set comprising at least three rotational members of which a first rotational member is connected to the input, a second rotational member is coupled to the output, and a third rotational member is connected to a brake, wherein the transmission further includes a second input shaft where a second switchable speed transforming gear is present between the second input shaft and the output shaft, and where the second rotational member of the planetary gear set is connected to the second input shaft;
wherein the first and the second rotational members can be coupled directly to each other by means of the clutch and a further clutch or clutches connected in series thereto, without the use of a further speed transforming gear;
wherein the further clutch or clutches can directly couple the first and the second input shaft of the transmission to each other without the use of a further speed transforming gear.

7. A transmission system as claimed in claim 6, further comprising a first gear clutch located between the first input shaft and the output shaft of the transmission.

8. A transmission system as claimed in claim 7, wherein the first gear clutch is located between the first speed transforming gear and the output shaft.

9. A transmission system as claimed in claim 7, further comprising a second gear clutch located between the second input shaft and the output shaft of the transmission.

10. A transmission system as claimed in claim 9, wherein the second gear clutch is located between the second input shaft and the second speed transforming gear.

11. A transmission system as claimed in claim 9, further comprising a third speed transforming gear and a third gear clutch located between the first input shaft and the output shaft of the transmission.

12. A transmission system as claimed in claim 11, wherein the third gear clutch is located between the third speed transforming gear and the output shaft.

13. A transmission system as claimed in claim 11, wherein the second speed transforming gear forms the third gear if the third rotational member of the planetary gear set is braked and the second gear clutch is closed.

14. A transmission system as claimed in claim 11, wherein the first speed transforming gear forms the first gear if the third rotational member of the planetary gear set is braked and the further clutch or clutches and the first gear clutch are closed.

15. A transmission system as claimed in claim 11, wherein the first speed transforming gear forms the second gear if the clutch or clutches and the first gear clutch are closed.

16. A transmission system as claimed in claim 11, wherein the third speed transforming gear forms the fourth gear if the third rotational member of the planetary gear set is braked and the further clutch or clutches and the third gear clutch are closed.

17. A transmission system as claimed in claim 11, wherein the third speed transforming gear forms the fourth gear if the clutch and the third gear clutch are closed.

18. A transmission system as claimed in claim 11, wherein the third speed transforming gear forms the fifth gear if the clutch and the third gear clutch are closed.

* * * * *